United States Patent [19]

Ogihara et al.

[11] Patent Number: 4,782,353
[45] Date of Patent: Nov. 1, 1988

[54] STEPPING MOTOR-DRIVEN SECTOR OPENING/CLOSING DEVICE

[75] Inventors: Masuo Ogihara; Shigeru Tagami; Nobuo Shinozaki, all of Yotsukaido, Japan

[73] Assignee: Seikosha Co., Ltd., Tokyo, Japan

[21] Appl. No.: 706,127

[22] Filed: Feb. 27, 1985

[30] Foreign Application Priority Data

Feb. 27, 1984 [JP] Japan ................................. 59-26804
Feb. 27, 1984 [JP] Japan ................................. 59-26808

[51] Int. Cl.⁴ .............................................. G03B 9/08
[52] U.S. Cl. .................................. 354/234.1; 354/439; 310/49 R; 310/112; 310/156
[58] Field of Search ............. 310/49 R, 40 MM, 162, 310/163, 216, 164, 83, 156, 112, 254; 354/234.1, 238.1, 239, 439, 452, 258.1, 271.1

[56] References Cited

U.S. PATENT DOCUMENTS

| | | | |
|---|---|---|---|
| 1,185,337 | 5/1916 | McCartney | 354/239 |
| 2,970,529 | 2/1961 | Nieuwenhoven | 354/234.1 |
| 3,698,300 | 10/1972 | Kobori | 354/238.1 |
| 3,969,642 | 7/1976 | Yoshino | 310/49 R |
| 4,009,866 | 3/1977 | Iwata | 354/439 |
| 4,016,574 | 4/1977 | Iwata | 354/439 |
| 4,057,810 | 11/1977 | Iwata | 354/439 |
| 4,079,390 | 3/1979 | Iwata | 354/452 |
| 4,144,467 | 3/1979 | Kakajima | 310/49 R |
| 4,218,121 | 8/1980 | Nakagawa | 354/271.1 |
| 4,267,472 | 5/1981 | Sudler | 310/156 |
| 4,371,821 | 2/1983 | Laesser | 310/49 R |
| 4,491,751 | 1/1985 | Kuznetsova et al. | 310/49 R |
| 4,518,884 | 5/1985 | Chatelain | 310/49 R |

FOREIGN PATENT DOCUMENTS

| | | | |
|---|---|---|---|
| 0093330 | 6/1982 | Japan | 354/234.1 |
| 0027134 | 2/1983 | Japan | 354/234.1 |
| 0067518 | 4/1984 | Japan | 354/234.1 |

Primary Examiner—R. Skudy
Attorney, Agent, or Firm—Bruce L. Adams; Van C. Wilks

[57] ABSTRACT

In a program shutter using a stepping motor for opening and closing sectors, the stepping motor is composed of a 4-pole magnetized rotor and two sets of U-shaped stators and coils, the stators being each provided with a pair of leg portions which are formed with magnetic poles at end portions thereof in an opposed relation to the outer periphery of the rotor, the magnetic poles at the leg end portions of each stator being formed in a phase relation of 90° with respect to the rotational center of the rotor, and one magnetic poles of the stators being disposed in proximity to each other so as to in a phase relation of 45° with respect to the rotational center of the rotor.

14 Claims, 5 Drawing Sheets

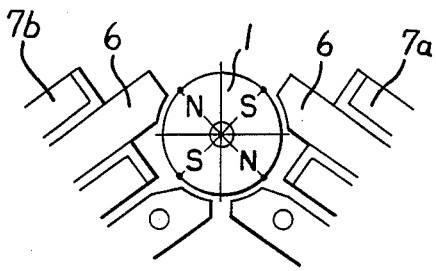
FIG. 6(a)
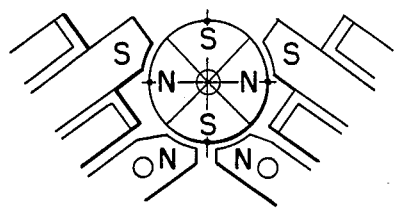
FIG. 6(e-2)
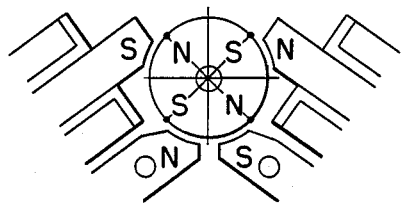
FIG. 6(b)
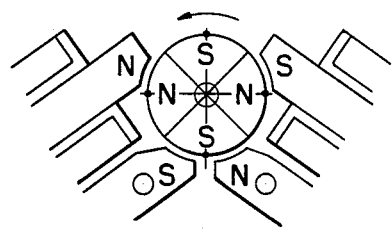
FIG. 6(f)
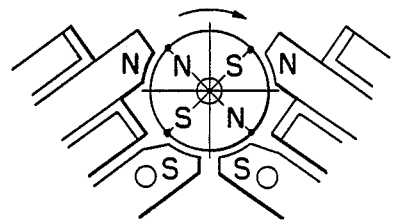
FIG. 6(c)
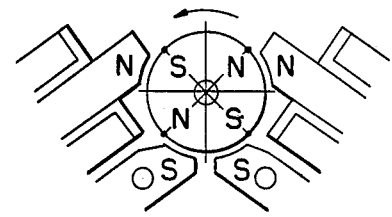
FIG. 6(g)
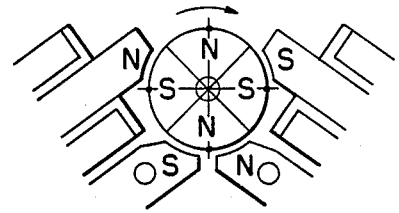
FIG. 6(d)
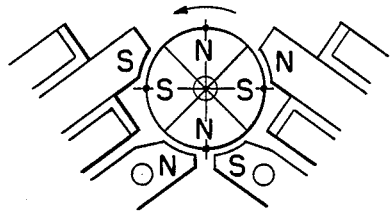
FIG. 6(h)
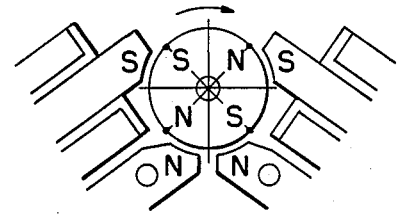
FIG. 6(e-1)
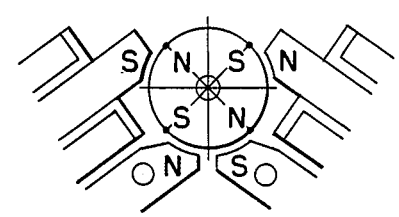
FIG. 6(i)

STEPPING MOTOR-DRIVEN SECTOR OPENING/CLOSING DEVICE

BACKGROUND OF THE INVENTION

The present invention relates to a sector opening/closing device using a stepping motor in a camera shutter.

Generally, a stepping motor incorporated in an opening/closing device of a camera is desired to have a high efficiency, consume less current and small in size because a battery is used as a power source. Besides, the stepping motor must be forward/reverse rotatable for effecting sector opening and closing operations, and so it requires at least two sets of coils and stators, thus resulting, according to the prior art, a construction in which each stator and iron core are separated, or a construction in which the stators are overlapped on a plane. Consequently, not only a larger number of components are required but also the support structures for the stator, etc. become more complicated, thus making it difficult to attain reduction in size and thickness. Further, the ordinary camera shutter portion is circular in shape and has a centrally formed lens aperture, so it is necessary that the sector opening/closing device is constituted in a doughnut-like space. But, conventional circular or square motor units are disadvantageous in point of space and thus have been inappropriate as sector opening/closing devices in compact cameras.

According to the present invention, therefore, there is provided a sector opening/closing device which has remedied the above-mentioned drawbacks.

More particularly, according to the present invention, in a sector opening/closing device having a plurality of sectors which form a lens aperture, a forward/reverse rotatable stepping motor and means for transmitting the operation of the stepping motor to the sectors, the stepping motor is composed of a radially 4-pole magnetized rotor, two U-shaped stators each having a pair of leg portion, each leg portion having a magnetic pole portion formed at the force end thereof in opposed relation to the outer periphery of the rotor, and coils for exciting the stators.

BRIEF DESCRIPTION OF THE DRAWINGS

FIGS. 6(a) through (d), (f) through (i), (e-1) and (e-2) show varying relationships between magnetic field and the magnetic pole portion.

An embodiment of the present invention will be described hereinunder with reference to the accompanying drawings.

Figure 1:
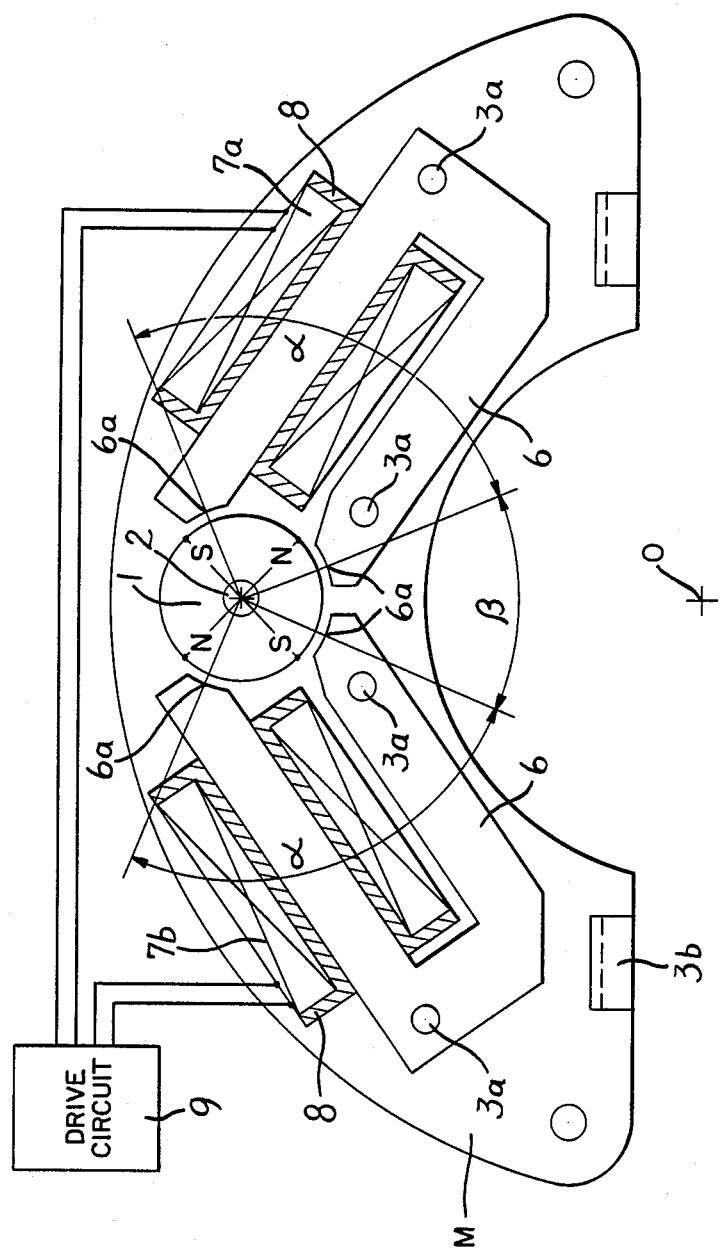
FIGS. 1 and 2 show construction of a bi-directional stepping motor portion.
Figure 2:
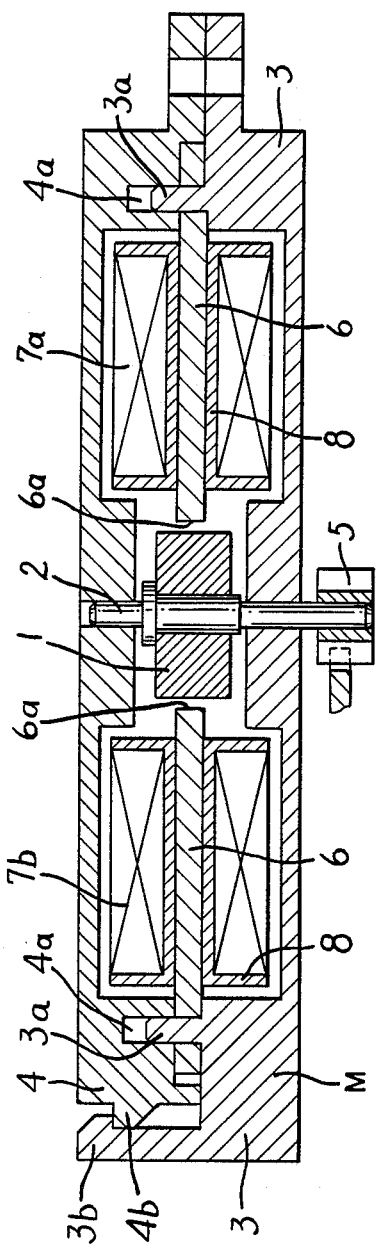

Referring first to FIGS. 1 and 2, there is illustrated a construction of a bidirectional stepping motor portion (M) embodying the present invention, in which a rotor 1 comprising a permanent magnet having four radially arranged poles is integrally fixed to a rotor shaft 2. One end of the rotor shaft 2 is rotatably supported by a hole formed in an arc-shaped lower plate 3, while the other end thereof is rotatably supported by a hold formed in an arc-shaped upper plate 4. The said one end of the rotor shaft 2 extends through the hole in the lower plate 3, and to the fore end portion thereof is fixed a rotor pinion 5 for transmitting the bidirectional rotation of the rotor 1 to a later-described gear train. The numeral 6 denotes a two-pole stator which has a pair of leg portions in a U-shaped one-piece structure. At an end of each leg portion is formed a magnetic pole portion 6a in opposed relation to the outer periphery of the rotor 1. The magnetic pole portions 6a of each leg portion are formed in a phase relation of 90° in terms of an angle ($\alpha$) relative to the center of the rotor 1. As to the stator 6, two stators 6 of the same shape are disposed on the same plane while allowing one magnetic pole portions 6a of the stators to be in proximity to each other so as to be in a phase relation of 45° in terms of an angle ($\beta$) relative to the center of the rotor 1. The stators 6 are positioned by guide pins 3a formed on the lower plate 3. Further, two coils 7a and 7b for inducing a magnetic field in the magnetic pole portions 6a of the stators are connected to a drive circuit 9 as will be described later. The coils 7a and 7b are wound around coil frames 8 and fitted on the leg portions on the side opposite to the proximate magnetic pole portions 6a of the stators 6. The lower plate 3 and upper plate 4 are formed by plastic molding, and the lower plate 3 has a retaining pawl 3b for mounting and fixing the upper plate 4, while the upper plate 4 has guide holes 4a for engagement with the guide pins 3a of the lower plate and a lug 4b for engagement with the retaining pawl 3b. The two stators 6 with the coils 7a and 7b attached thereto and the rotor 1 are mounted on the lower plate 3 and then covered with the upper plate 4 so that the retaining pawl 3b and the lug 4b come into engagement with each other, whereby the lower and upper plates 3 and 4 and the stators 6 are fixed and the rotor 1 is supported rotatably. In this manner, the plates 3 and 4 comprise an arcuate support for supporting the stepping motor (M).

Figure 4:
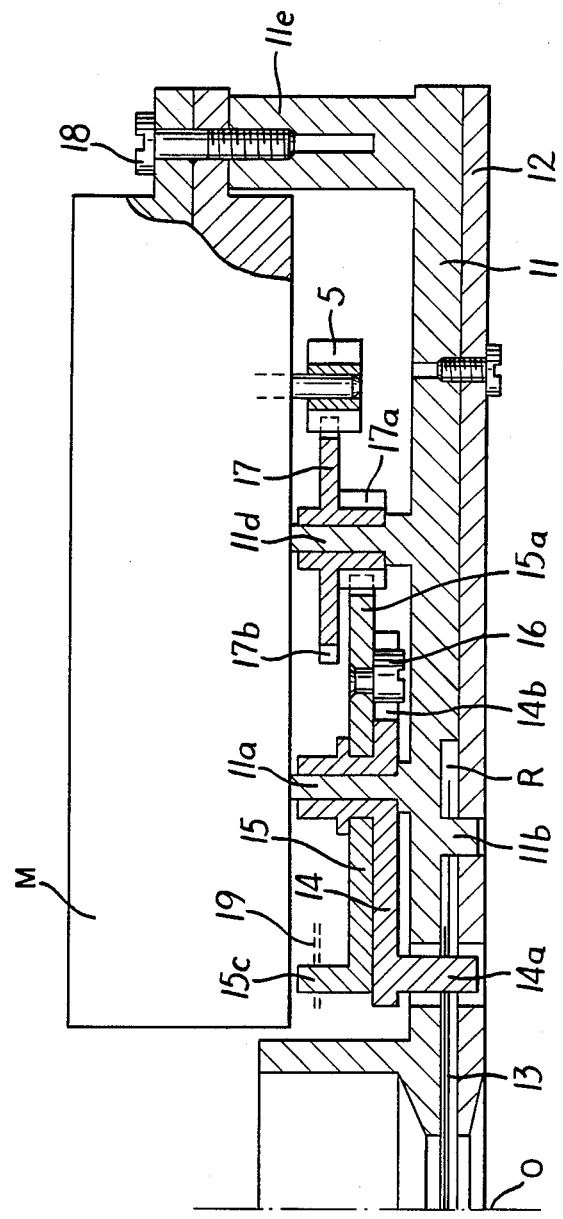
FIGS. 3 and 4 show construction of a wheel train portion and a sector portion.
Figure 3:
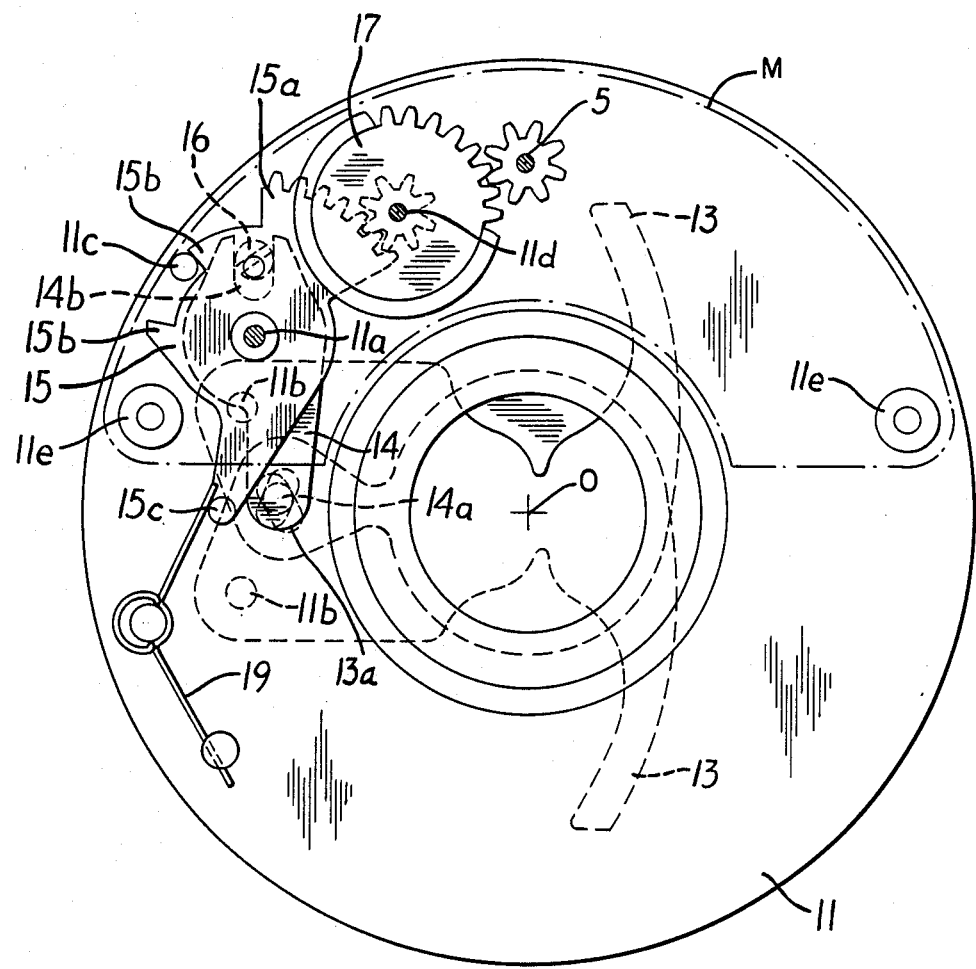

Referring now to FIGS. 3 and 4, there is illustrated a construction of a wheel train portion and a sector portion which are operated by the stepping motor (M), in which a base plate 12 is fixed with bolts to a lens holder plate 11. The holder plate 11 and the base plate 12 are centrally formed with a lens aperture (O), and a sector room (R) for housing therein later-described sectors 13 is formed therebetween. The numeral 14 denotes a sector driving lever, which is rotatably supported by a rotating shaft 11a formed on the holder plate 11 and which is so supported as not to come off by the lower surface portion of the stepping motor (M). To the sector driving lever 14 is rotatably attached a sector driving wheel 15 as will be described later, and the sector driving lever, and a recess 14b formed in the sector driving lever 14 and a later-described adjusting pin 16 fixed to the sector driving wheel 15 are engaged with each other to restrict the rotation of both (14 and 15). Further, the sector lever 14 is provided with a sector pin 14a which extends through the holder plate 11 and engages a recess 13a formed in each sector 13. The sector 13 is rotatably supported by a pin 11b formed on the holder plate 11. Two such sectors 13 are disposed in symmetrical positions to define an aperture. The sector driving wheel 15 attached to the sector driving lever 14 has a toothed portion 15a which is in mesh with a later-described idler wheel 17, an engaging portion 15b adapted to engage a pin 11c formed on the holder plate 11 to restrict rotation, and a pin 15c which is engaged with a spring 19. The sector driving wheel 15 is urged in a counterclockwise direction by means of the spring 19. The adjusting pin 16 fixed to the sector driving wheel 15 has a diametrical portion engaged with the sector driving wheel 15 and a diametrical portion engaged with the recess 14b of the sector driving lever, both such diametrical portions being eccentric from each other, and it is fixed to the sector driving wheel 15 so as to be rotatable at a predetermined frictional slip torque by caulking or any other suitable means. Therefore, by turning a slotted portion of the adjusting pin 16 with a screw-driver or the like, it is made possible to adjust the phase relation between the toothed portion 15a of the sector driving wheel and the sector pin 14a of the sector driving lever. The numeral 17 denotes an idler wheel having a pinion portion 17a which is in mesh with the toothed portion 15a of the sector driving wheel and a toothed portion 17b which is in mesh with the rotor pinion 5. The idler wheel 17 is rotatably supported by a rotating shaft 11d formed on the holder plate 11 and so supported as not to come off by the lower surface portion of the stepping motor (M). The holder plate 11 is further provided with a post 11e for mounting the stepping motor (M). More specifically, the stepping motor (M) is fixed to the post 11e with a set-screw 18, whereby it becomes possible for the rotor pinion 5 and the idler wheel 17 to engage each other and transmit rotation.

Figure 5A:
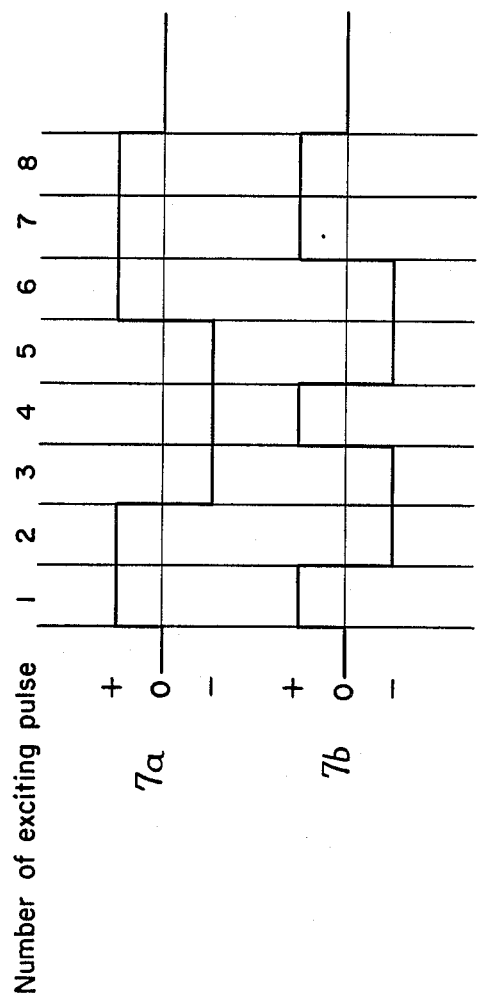
FIGS. 5(a) and (b) are diagrams showing output signals from the drive circuit and a section driven by the pulses of FIG. 5(a).
Figure 5B:
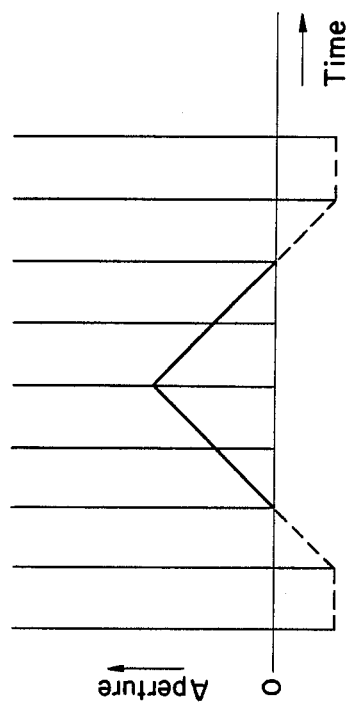

Referring now to FIG. 5(a), there are illustrated output signals from the drive circuit 9 for energizing the two coils 7a and 7b to generate a predetermined magnetic field in each magnetic pole portion 6a of the stators. The driving signals are two-phase excitation type driving signals of a known bipolar drive in which the coil exciting current is in both plus(+) and minus(−) directions and it flows through the two coils at all times. The driving signals are correlated with photometric and distance informations on the object. For example, where the brightness of the object is low, the number of coil exciting pulses is increased, while when the object is bright, the number of such exciting pulse is decreased. FIG. 5(b) is an operation diagram of the sector 13 as driven by the pulses of FIG. 5(a). As seen from the operation diagram, the sector 13 controls both the exposure time and the lens aperture.

Since the stepping motor (M) used in a circular shutter must be formed in a doughnut-like or annular space, the elongated stators 6 are disposed on an arcuate support 3 having an inner arcuate periphery in FIG. 1, and the leg portions having proximate magnetic pole portions of the stators 6 are positioned along the lens aperture (O) side, i.e., along the inner periphery of the support 3, 4 which surrounds part of the lens aperture, while the other leg portions are positioned on the outer peripheral side, with the coils 7a and 7b being mounted on the outer leg portions. This arrangement permits the rotor 1 to be disposed at the central part of the stepping motor (M), so that the shutter is not affected by an external magnetic member, and there can be attained advantages in point of coil space and planar arrangement.

With the above construction, the sector opening/closing device of the invention operates in the following manner.

When the two coils 7a and 7b are not energized, there exists a static stable state which is stationary in a balanced state at every ¼ angle (90°) of one rotation of the rotor 1 by virtue of a magnetic coupling force between the four magnetic pole portions 6a of the two stators and the four NS poles of the rotor 1 as well as the foregoing phase relationship. For example, such static stable states are assumed to be stationary in such relationship as shown in FIG. 6(a). The sector driving wheel 15 is in the position of engagement of its counterclockwise engaging portion 15b with the pin 11c, and the two sectors 13 engaged with the pin 14a of the sector driving lever are in a state in which the lens aperture (O) is closed.

In this state, release means or photometric means of camera (not shown) are operated to determine output signals from the drive circuit 9, for example, as in FIG. 5(a) according to information on the object. The output signals are applied to the two coils 7a and 7b to effect the following sector opening/closing operations. The first pulse is applied to generate such a magnetic field as shown in FIG. 6(b) in the magnetic pole portions 6a of the stators so as to maintain the stationary state of the rotor 1 like shown in FIG. 6(a). The rotor 1 does not move while current is not fed, by virtue of the foregoing magnetic coupling force between the rotor and the stator magnetic pole portions 6a, but in the event a large external force or shock is exerted on the camera, the above standstill position will be deflected. This impedes the normal operation of the shutter. Thus, the first exciting pulse functions to correct the standstill position of the rotor 1 for preventing such inconvenience. Next, the same pulse as the first pulse is applied to the coil 7a, while an inverted-current pulse is applied to the coil 7b, whereupon such a magnetic field as shown in FIG. 6(c) is generated, so that the rotor 1 turns 45° clockwise up to its position shown in FIG. 6(d). This rotation of the rotor 1 is transmitted to the sectors 13 through rotor pinion 5, idler wheel 17, sector driving wheel 15 and sector driving lever 14, so that the sectors 13 begin to open. Then thirdly, the same pulse as the second pulse is applied to the coil 7b, while an inverted-current pulse is applied to the coil 7a, to generate such a magnetic field as shown in FIG. 6(d), so that the rotor 1 further turns 45° clockwise and the sectors 13 begin to open. With the next fourth pulses applied, there is induced such a magnetic field as shown in FIG. 6(e-1), thereby causing the rotor 1 to further rotate clockwise up to the state of FIG. 6(e-2). Thereafter, the electric current on the coil 7b side is inverted against the fourth pulse, whereby a magnetic field is induced like shown in FIG. 6(f), so that the rotor 1 begins to rotate in a counterclockwise direction and at the same time the sectors start the closing operation. This closing operation advances with excitation of the sixth and seventh pulses as shown in FIGS. 6(g) and 6(h), respectively, and at the end of the seventh pulse the sectors assume the same position as that before operation in which the engaging portion 15b of the sector driving wheel and the pin 11c are engaged with each other. In this case, the engaging portion 15b of the sector driving wheel and the pin 11c will strike and repel each other under inertial motions of the sectors 13 and the rotor 1, so that the sectors 13 again try to operate in the opening direction. But, by exciting like shown in FIG. 6(i) with eighth pulses, the rotor 1 is held in its stop position to restrict the operation of the sectors 13. Thereafter, the current supply to the two coils 7a and 7b is discontinued, so the rotor 1 stops in its initial position of FIG. 6(a) and the operation of the camera terminates. The spring 19 which urges the sector driving wheel 15 in the counterclockwise direction is for preventing variation in the aperture defined by the sectors 13 and the resultant deterioration of the exposure performance which may be caused by the clearance and backlash respectively of rotation support portions and engaging portions such as rotor pinion 5, idler wheel 17 and sector driving wheel 15. The spring 19 may be omitted in a low-grade camera not requiring high performance. As to the adjusting pin 16 which connects the sector driving wheel 15 with the sector driving lever 14, by turning it with a screw-driver or the like, there arises a change in phase relation of the sector driving lever 14, thereby causing a change in the amount of overlap of the two sectors 13 before operation and a change in the aperture diameter during the opening operation. Thus, the pin 16 is used for adjusting the exposure. In the above operation, the current is inverted from the fourth to fifth pulse to rotate the rotor 1 in the reverse direction. In this connection, the shutter is programmed so that the timing of such inverted pulse varies according to photometric and distance informations, for example, where the object is bright or in the case of a short-distance photographing using an electronic flash, the pulse inversion is performed in a less pulsed position, while when the object is dark or in the case of a long-distance photographing using an electronic flash, such inversion is allowed to take place in a more pulsed position.

In connection with the stepping motor construction according to the present invention, the stator portion other than the magnetic pole portions can take a relatively free shape provided the magnetic pole portions are held in the foregoing phase relationship. Therefore, where the sector opening/closing device is constituted in a doughnut-like space like this embodiment, not only an arcuate stepping motor but also a rectangular stepping motor can be constituted very easily.

According to the present invention, as set forth hereinabove, since the stepping motor portion comprises a 4-pole rotor and two U-shaped stators which are arranged planarly, a simpler structure and reduction in thickness can be attained as compared with the prior art. Moreover, a high efficiency small-sized stepping motor can be constituted by using a rare earth magnet as the rotor magnet material, and hence the sector opening/closing device can be constituted in a compact form. Further, because of a relatively large freedom of shape except the phase relationships of the stator magnetic portions, not only a great advantage is attained in point of design, but also the number of components required is small, and thus the device of the present invention is superior in assembling and mass-producing properties as well economy.

We claim:

1. A sector opening/closing device in a shutter having a plurality of sectors for forming a lens aperture, a forward/reverse rotatable stepping motor and a gear train for interconnecting the sectors and the stepping motor so as to control the sector opening and closing strokes: wherein said stepping motor comprises a support having an inner arcuate periphery, an outer periphery outwardly spaced from the inner arcuate periphery and an opening in the support, a rotor having a permanent magnet supported rotatably in the support opening and having four magnetic poles radially, two U-shaped elongated stators each made of a single piece, each stator having a pair of leg portions with magnetic pole portions formed at ends thereof, said two elongated stators being disposed on the support along the inner arcuate periphery thereof partially surrounding the periphery of the lens aperture around the rotor so that the magnetic pole portions of the stator are opposed to the outer periphery of the rotor, and coils for exciting said stators.

2. A sector opening/closing device according to claim 1, wherein the magnetic pole portions of each said stator are formed in a phase relation of 90° with respect to the rotational center of said rotor, said stators are disposed so that one magnetic pole portions of said stators are in proximity to each other in a phase relation of 45° with respect to the rotational center of said rotor, and the leg portions having said proximate magnetic pole portions are disposed on the lens aperture side.

3. A sector opening/closing device according to claim 2, wherein said coils are mounted on the leg portions on the side opposite to the leg portions having said proximate magnetic pole portions.

4. A sector opening/closing device according to claim 1, wherein said coils are mounted on the leg portions on the side opposite to the leg portions having said proximate magnetic pole portions.

5. In a shutter having a movable sector driveable to effect opening and closing of a lens aperture and a bidirectional stepping motor for driving the sector, the bidirectional stepping motor comprising: a support having an inner arcuate periphery, an outer periphery outwardly spaced from the inner arcuate periphery and an opening in the support; a rotor disposed in the support opening and bidirectionally rotatable for driving the sector in opening and closing directions; a pair of elongated two-pole stators disposed on the support along the inner arcuate periphery thereof which partially surrounds a periphery of the lens aperture, the pair of two-pole stators facing the rotor; and a pair of coils for exciting respective ones of the stators to rotate the rotor.

6. In a shutter according to claim 5, wherein each two-pole stator comprises a one-piece structure of generally U-shape having a pair of leg portions with magnetic pole portions formed at the ends thereof, the magnetic pole portions facing the rotor.

7. In a shutter according to claim 6, wherein the magnetic pole portions of each stator are disposed in a phase relation of 90° with respect to the rotational center of the rotor, the magnetic pole portions which are disposed at the ends of the leg portions adjacent to the lens aperture being disposed in proximity to each other in a phase relation of 45° with respect to the rotational center of the rotor, and the rotor comprising a permanent magnet having four radial magnetic poles effective to effect bidirectional rotation of the rotor upon receiving magnetic force produced at the magnetic pole portions of the stators.

8. In a shutter according to claim 6, wherein one of the two leg portions of each stator is disposed adjacent to the lens aperture, and the coils are mounted on the other of the two leg portions.

9. In a shutter according to claim 5, wherein the support comprises an arc-shaped plate disposed around the lens aperture for supporting the pair of stators and for rotatably supporting the rotor.

10. In a shutter having a movable sector driveable to effect opening and closing of a lens aperture and a bidirectional stepping motor for driving the sector, the bidirectional stepping motor comprising: an arcuate support having an inner periphery surrounding part of the lens aperture and an outer periphery outwardly spaced from the inner periphery; a rotor disposed in an opening in the arcuate support and bidirectionally rotatable for driving the sector in opening and closing directions; a pair of two-pole stators mounted on the arcuate support in opposed relation with respect to the rotor, each of the two-pole stators having a pair of leg portions, one leg portion of each of the two-pole stators being disposed along the inner periphery of the arcuate support and the other leg portion of each of the two-pole stators being disposed adjacent to the outer periphery of the arcuate support; and a pair of coils for exciting respective ones of the stators to effect rotation of the rotor.

11. In a shutter according to claim 10, wherein the bidirectional stepping motor drives the movable sector in opening and closing directions to control both the exposure time and the lens aperture.

12. In a shutter according to claim 10, wherein each two-pole stator comprises a one-piece structure of generally U-shape having a pair of leg portions with magnetic pole portions formed at the ends thereof, the magnetic pole portions facing the rotor.

13. In a shutter according to claim 12, wherein the magnetic pole portions of each stator are disposed in a phase relation of 90° with respect to the rotational center of the rotor, the magnetic pole portions which are disposed at the ends of the leg portions adjacent to the lens aperture being disposed in proximity to each other in a phase relation of 45° with respect to the rotational center of the rotor, and the rotor comprising a permanent magnet having four radial magnetic poles effective to effect bidirectional rotation of the rotor upon receiving magnetic force produced at the magnetic pole portions of the stators.

14. In a shutter according to claim 10, wherein the coils are mounted on the other of the two leg portions disposed adjacent to the outer periphery of the arcuate support.

* * * * *